(12) United States Patent
Haldar et al.

(10) Patent No.: US 11,012,506 B2
(45) Date of Patent: May 18, 2021

(54) NODE AND CLUSTER MANAGEMENT ON DISTRIBUTED SELF-GOVERNED ECOSYSTEM

(71) Applicant: MICROSOFT TECHNOLOGY LICENSING, LLC, Redmond, WA (US)

(72) Inventors: Abhijeet Haldar, Hyderabad (IN); Imran Siddique, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/354,611

(22) Filed: Mar. 15, 2019

(65) Prior Publication Data
US 2020/0296158 A1 Sep. 17, 2020

(51) Int. Cl.
*G06F 15/173* (2006.01)
*H04L 29/08* (2006.01)
(Continued)

(52) U.S. Cl.
CPC ...... *H04L 67/1095* (2013.01); *G06F 16/9035* (2019.01); *H04L 9/0816* (2013.01); *H04L 9/30* (2013.01); *H04L 41/0806* (2013.01)

(58) Field of Classification Search
CPC ..... H04L 67/1095; H04L 9/0816; H04L 9/30; H04L 41/0806; G06F 16/9035
(Continued)

(56) References Cited

U.S. PATENT DOCUMENTS 8,935,692 B2* 1/2015 Ferris .................. G06F 9/45533
718/1
10,769,241 B1* 9/2020 McNair ................. G16H 10/60
(Continued)

FOREIGN PATENT DOCUMENTS

GB 2437649 A 10/2007

OTHER PUBLICATIONS

Google Developers, A.I. Experiments: Visualizing High-Dimensional Space, Nov. 15, 2016, YouTube, 0:12-1:08, Retrieved via URL: https://www.youtube.com/watch?v=wvsE8jm1GzE&feature=emb_logo (Year: 2016).*
(Continued)

*Primary Examiner* — Tonia L Dollinger
*Assistant Examiner* — Schquita D Goodwin
(74) *Attorney, Agent, or Firm* — Workman Nydegger (57) ABSTRACT

Adding a computing node to a distributed computing system. A method includes executing a binary, for nodes of the distributed computing system, at the computing node. A public node is identified as a result of executing the binary. Various characteristics of the computing node are identified as a result of executing the binary. The various characteristics are provided to the public node. The computing node receives from the public node a registration confirmation packet comprising information identifying a category from among a plurality of categories of the distributed computing system. The identified category is identified for the computing node based on the identified characteristics of the computing node, and based on the health of the identified category. The computing node is connected to the distributed computing system by the computing node connecting to the identified category.

20 Claims, 8 Drawing Sheets

(51) Int. Cl.
  *G06F 16/9035* (2019.01)
  *H04L 9/08* (2006.01)
  *H04L 9/30* (2006.01)
  *H04L 12/24* (2006.01)

(58) Field of Classification Search
  USPC ........................................................ 709/226
  See application file for complete search history.

(56) References Cited

U.S. PATENT DOCUMENTS

| | | | | |
|---|---|---|---|---|
| 2006/0037016 A1* | 2/2006 | Saha | ..................... | G06F 9/5061 717/178 |
| 2008/0281954 A1* | 11/2008 | Bagal | ..................... | H04L 67/303 709/223 |
| 2013/0219036 A1* | 8/2013 | Gusev | ..................... | G06F 9/5061 709/223 |
| 2014/0026231 A1* | 1/2014 | Barak | ..................... | G06F 9/45558 726/29 |
| 2014/0201302 A1* | 7/2014 | Dube | ..................... | G06F 12/08 709/212 |
| 2015/0007173 A1* | 1/2015 | Ionescu | ..................... | G06F 9/45533 718/1 |
| 2015/0373103 A1* | 12/2015 | Tessier | ..................... | H04L 67/1095 709/203 |
| 2016/0224329 A1* | 8/2016 | Whitney | ..................... | G06F 8/71 |
| 2018/0097701 A1* | 4/2018 | Wu | ..................... | H04L 41/12 |
| 2019/0036702 A1* | 1/2019 | Kano | ..................... | G06F 16/182 |
| 2019/0130073 A1* | 5/2019 | Sun | ..................... | G16H 50/70 |
| 2019/0140822 A1* | 5/2019 | Xie | ..................... | G06Q 20/223 |
| 2019/0238323 A1* | 8/2019 | Bunch | ..................... | H04L 9/0877 |
| 2019/0334990 A1* | 10/2019 | Enz | ..................... | H04L 67/1097 |
| 2020/0110764 A1* | 4/2020 | Pollak | ..................... | G06F 16/2455 |

OTHER PUBLICATIONS

"International Search Report and Written Opinion Issued in PCT Application No. PCT/US2020/015521", dated May 18, 2020, 15 Pages.

* cited by examiner

NODE AND CLUSTER MANAGEMENT ON DISTRIBUTED SELF-GOVERNED ECOSYSTEM

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems. Some such distributed computing systems are voluntary peer to peer like distributed computing systems where computing devices indicate their availability to join a distributed computing system with other voluntarily available computing devices. Thus, if a computing device that wishes to becoming node in such a distributed computing system, the computing device will contact other nodes in the distributed computing system and indicate their availability to participate in the distributed computing system. In some such systems, information about nodes in the system is contained in a distributed ledger, such as in a blockchain in a blockchain network.

Often in these types of distributed computing systems, each of the nodes in the distributed computing system has similar functionality to other nodes in the distributed computing system. That is, each of the nodes is able to perform the same computations, store the same data, and otherwise function similar to other nodes in the distributed computing system. This is done as the blockchain network typically performs operations and stores data by consensus, and thus the various nodes of the blockchain network must be able to perform operations similarly and store data similarly. However, this results in some limitations to such computing systems. In particular, any computing device wishing to join the distributed computing system will need to have a minimum set of requirements to be able to participate in the distributed computing system. Additionally, while more powerful systems can join the distributed computing system, their additional power is typically not exploited by the distributed computing system, but rather they are used in a fashion similar to less powerful computing devices in the distributed computing system.

Thus, such distributed computing systems have several drawbacks that may be exhibited including: nodes participating in processes beyond their capacity, heuristic-based partitioning which is a known point of failure, the inability to store large numbers of records in every node, the inability to scale such distributed computing systems, risk of disclosure of all data in the entire distributed computing system if a single node is compromised, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing system. The method includes acts for adding a computing node to the distributed computing system. The method includes executing a binary, for nodes of the distributed computing system, at the computing node. A public node is identified as a result of executing the binary. Various characteristics of the computing node are identified as a result of executing the binary. The various characteristics are provided to the public node. The computing node receives from the public node a registration confirmation packet comprising information identifying a category from among a plurality of categories of the distributed computing system. The identified category is identified for the computing node based on the identified characteristics of the computing node, and based on the health of the identified category. The computing node is connected to the distributed computing system by the computing node connecting to the identified category.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In one practical application, embodiments illustrated herein are able to identify the capabilities of various computing devices wishing to join a distributed computing system (i.e., a cluster), and to group similar computing devices into categories, where a category is a predetermined set of similar computing devices (where similarity is defined for each category) coupled either directly or indirectly as a set. For example, a computing device (which could be a processor, virtual machine, physical machine, cellular telephone, handheld device, and/or other computing device or combinations thereof) wishing to join a distributed computing system can execute a binary provided for nodes of the distributed computing system where the binary could identify characteristics of the computing device. For example, execution of the binary could identify compute capacity and type, memory availability and performance, storage space available, Internet IP availability, reachable private IP sets, average time of device connectivity to wide area networks, reliability, reachability, physical and/or logical proximity to other nodes in the distributed computing system, uptime of the computing device, ability to participate in various processing, mining, and/or data storage functionality, etc. This can be used to create an improved distributed computing system that is able to be composed of more diverse computing nodes than with previous computing systems, so as to be able to utilize computing nodes of various capabilities, and to be able to use nodes with significant capabilities closer to their full potential.

In some embodiments, this can be mapped into an n-dimensional graph mapping various nodes in the distributed computing system to identify nodes that are similar to the computing device wishing to join the distributed computing system. Additionally, embodiments can identify needs of various existing categories in the distributed computing system for additional node members. When the distributed computing system identifies that a computing device wishing to join the distributed computing system is sufficiently similar to nodes in a category needing additional members, then the computing device can be added to the category needing additional members, adding the computing device to the distributed computing system.

Each of the categories in the distributed computing system may perform different functionality than other categories in the distributed computing system. Thus, while nodes in a particular category may have similar capabilities and perform similar functions, different functions of the distributed computing system can be distributed across different categories of the distributed computing system. In this way, categories of less capable nodes can still contribute significantly to the distributed computing system to the extent that they are able, while categories of nodes comprising more powerful computing devices can perform other functions which would not be able to be performed by the nodes in the less capable categories. This allows for the implementation of an improved distributed computing system that is able to utilize higher powered computing devices at or near their capability capacities without needing to limit the capabilities of those devices to some least common denominator device existing in the distributed computing system.

Figure 1:
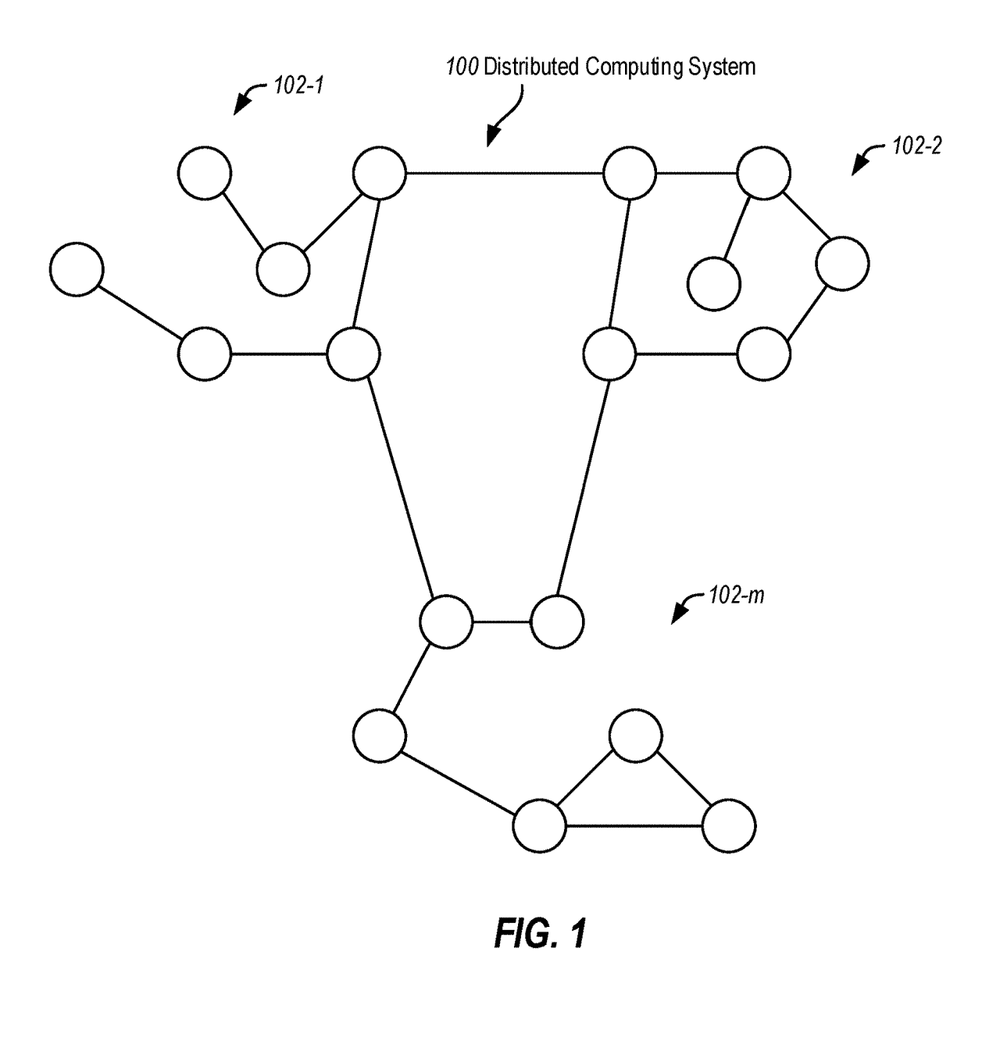
FIG. 1 illustrates a distributed computing system.

Referring now to FIG. 1, an example distributed computing system 100 is illustrated. The distributed computing system 100 includes a plurality of categories 102-1, 102-2, through 102-m. Each of the categories includes a plurality of nodes. As noted previously, the nodes in each of the categories is grouped into the categories according to characteristics of the nodes as well as the need for a given category to have additional nodes.

Figure 2:
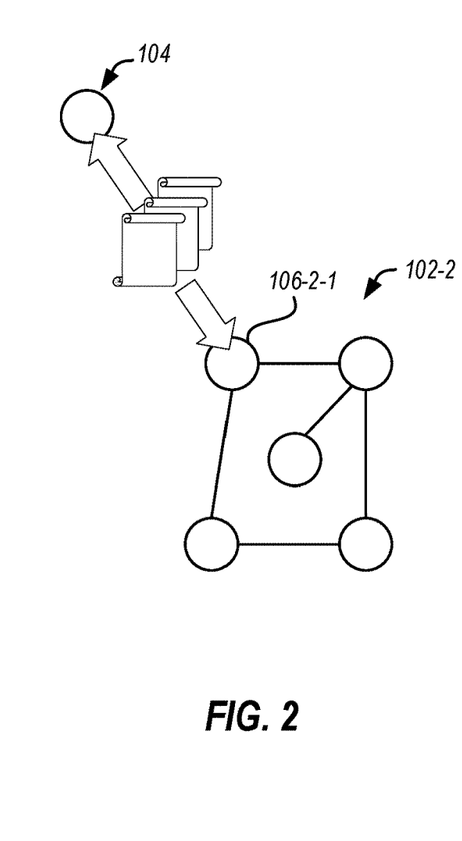
FIG. 2 illustrates a computing device joining a category.
Figure 3:
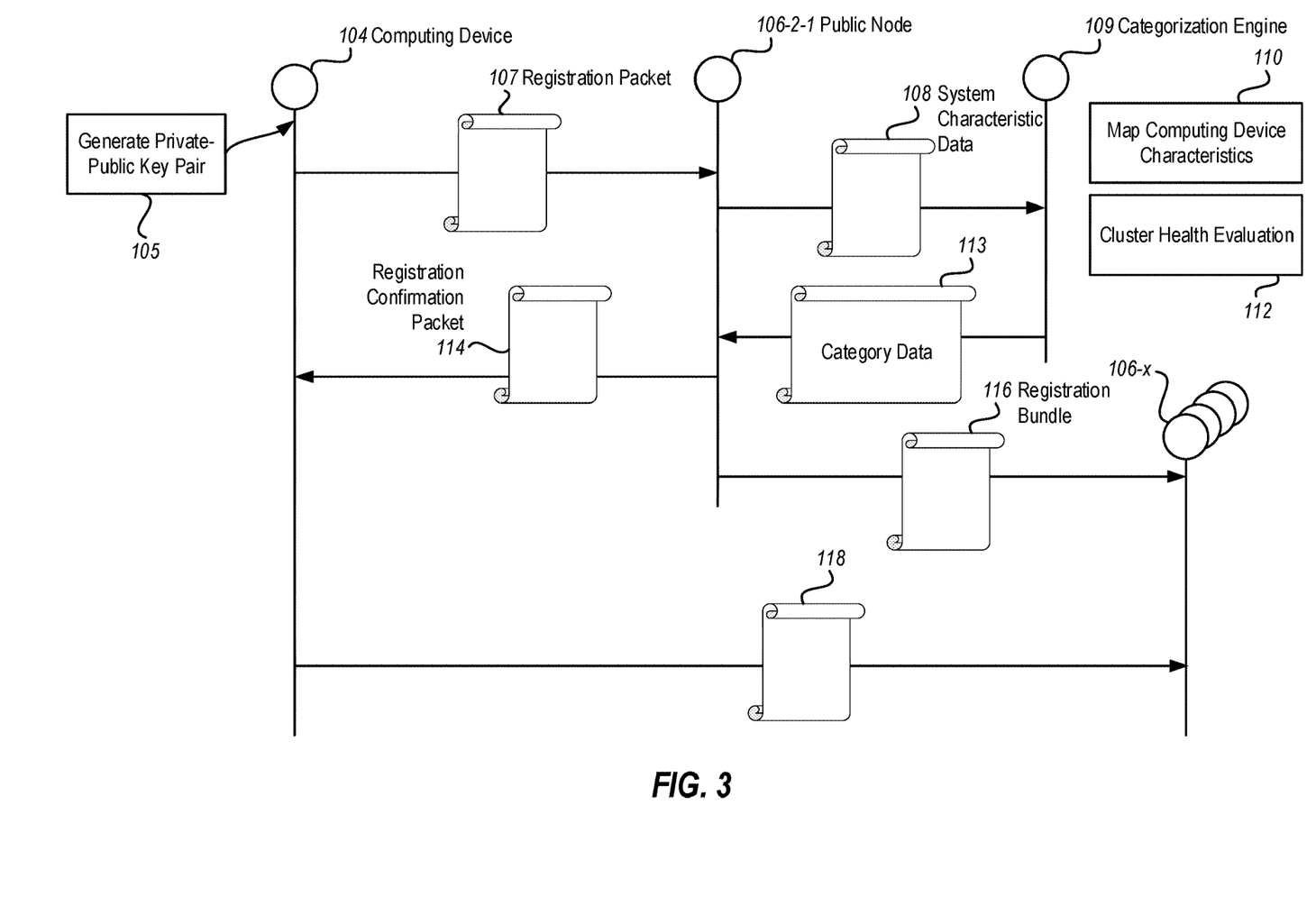
FIG. 3 illustrates a process flow of a computing device joining a category.

Referring to FIGS. 2 and 3, an example of a computing device wishing to join the distributed computing system 100 is illustrated. FIG. 2 illustrates that a computing device 104 exchanges various messages with a public node 106-2-1 in a category 102-2.

With reference now to FIG. 3, a particular message exchange in the connection process is illustrated. The computing device 104 generates a public-private key pair 105. The computing device 104 connects to the public node 106-2-1, where the public node 106-2-1 is a node configured to communicate with computing devices wishing to join the distributed computing system 100. In some embodiments, the computing device 104 is able to identify the public node 106-2-1 as a result of executing a binary for nodes of the distributed computing system 100. In some embodiments, the binary may be obtained from the public node 106-2-1 or another genesis server. Executing the binary identifies a number of pre-incorporated mirrors, or may include a link reference for a location where mirrors can be identified, where a mirror is a public node. The computing device will select a random public node, in this case public node 106-2-1. It should be appreciated however that the computing device 104 may select a public node from any of the categories in the distributed computing system 100, even when that public node is distinctly dissimilar as compared to the computing device 104. Thus, the computing device 104 will not necessarily connect with a public node in a category to which the computing device 104 will later be added. Indeed, probabilistically, the computing device 104 will connect with a public node in a category to which it will not later be added.

The computing device sends a registration packet 107 including system characteristic data 108 to the public node 106-2-1. The system characteristic data 108 includes characteristics such as compute capacity and type, memory availability and performance, storage space available, Internet IP availability, reachable private IP sets, average time of device connectivity to wide area networks, reliability, reachability, physical and/or logical proximity to other nodes in the distributed computing system, uptime of the computing device, ability to participate in various processing, mining, and/or data storage functionality, etc. For example, executing the binary on the computing device 104 may identify speed, architecture, type, etc. of a processor on the computing device 104. Alternatively or additionally, an amount, type, performance, or other characteristics of memory at the computing device 104 may be identified. Alternatively or additionally, the amount, type, performance, etc. of storage space available at the computing device 104 may be identified. Alternatively or additionally, the ability of the computing device 104 to connect to wide area networks such as the Internet including the speed at which the computing device 104 can connect to the wide area network may be identified. Alternatively or additionally, the ability of the computing device 104 to connect with certain private IP addresses may be identified. Alternatively or additionally, the amount of time that the computing device 104 can connect to wide area networks, such as the Internet, such as in a raw amount of time, percentage of time, or other measure may be identified. Alternatively or additionally, physical and/or logical distance between the computing device 104 and other nodes in the distributed computing system 100 may be identified. Alternatively or additionally, the uptime of the computing device (such as the number of hours in a given day that the computing device 104 is available to perform activities) may be identified. Alternatively or additionally, the ability of the device to participate in various processing, mining, and or data storage functionality may be identified. Note that the characteristics described above may be identified in any one of a number of different ways. For example, the computing device 104 may include various settings that enumerate capabilities of the computing device 104. Alternatively or additionally, execution of the binary may perform testing on the computing device 104 to attempt to identify the characteristics of the computing device 104.

As noted, once these current characteristics are identified, the system characteristic data 108 is sent to the public node 106-2-1 in the registration request packet 107 and for evaluation by the distributed computing system 100 to determine if the computing device 104 will be added to the distributed computing system 100, and to what category the computing device 104 will be added.

The computing device 104 sends the system characteristic data 108 to the public node 106-2-1 by encrypting the registration packet 107 with the public node's public key. The computing device 104 may also send its public-key as part of the system characteristic data 108.

The public node 106-2-1, receives the system characteristic data 108 as a registration request of the registration packet 107 and decrypts the system characteristic data 108 using its private key. The public node 106-2-1 parses the information in the system characteristic data 108 and sends the information to a categorization engine 109. Note that the categorization engine may be implemented using a different category of nodes capable of performing categorization functions.

As illustrated at 110 in FIG. 3, the categorization engine 109 can map the computing device 104 to attempt to identify similar nodes in the distributed computing system 100. For example, as will be discussed in additional detail below, the categorization engine 109 can map the computing device 104 into an n-dimensional vector map where n is the number of fields collected in the system characteristic data 108. The categorization engine 109 can map the computing device 104 with respect to other nodes in the distributed computing system 100 to attempt to identify similar nodes.

The categorization engine 109 then performs a cluster health evaluation as illustrated at 112 in FIG. 3. This health evaluation will be described in more detail below, however, in summary, the cluster health evaluation 112 attempts to ensure that both a sufficient number of nodes are implemented in a category and that too many nodes are not implemented in a given category so as to ensure that a given category is healthy (by having a sufficient number of nodes) and efficient (by not having too many nodes that need to synchronize).

Once the categorization engine 109 has identified an appropriate category for the computing device 104, category data 113 with such information is provided to the public node 106-2-1.

The public node 106-2-1 sends a registration confirmation packet 114 to the computing device 104. The registration confirmation packet 114 identifies to the computing device 104 the category to which the computing device 104 has been assigned, from the category data 113, including information such as nodes in the category to which the computing device 104 has been assigned. The registration confirmation packet 114 is bundled with the public-key of the public node 106-2-1.

The computing device 104 will also identify from the registration confirmation packet 114 various nodes that it can connect to in its assigned category. The computing device 104 may share its public-key along with any other public information with other nodes in its category to allow for later data sharing, rejoining the distributed computing system 100, etc. in this way, the computing device 104 is added to one of the categories of the distributed computing system 100, and hence the distributed computing system 100.

The public node 106-2-1 sends a registration bundle 116 to one or more nodes in a set of nodes 106-x, which are the nodes in the category which the computing device 104 has been assigned. In particular, the registration bundle 116 includes node information for the computing device 104, the public-key generated at 105, and a hash for the registration bundle 116. Thus, the registration bundle 116 and the hash are sent to other nodes 106-x in the same category as the computing device 104 by the public node 106-2-1. This can be done as an optimization for increasing the speed and efficiency with which the computing device 104 can be added to the category. In particular, the nodes 106-x can add information to the registration bundle 116 to a distributed ledger or other appropriate data structure to allow the computing device 104 to connect quickly as a node in the category. Note that while not shown, the public node 106-2-1 may later send the registration bundle 116 to other nodes that are external to the category. In this way, the computing device 104 can connect as a node to its assigned category quickly, and can later connect to other nodes in the distributed computing system 100 as appropriate.

As illustrated in FIG. 3 the computing device 104 obtains categorization information in the registration confirmation packet 114 and then attempts to connect (either directly or indirectly) to the nodes 106-x in the category. Messages, such as the message 118 from the computing device 104 to other nodes 106-x are encrypted using the private key of the computing device, and hashes for the messages are sent to the other nodes 106-x. Any node receiving the message 118 can decrypt the data in the messages 118 using the previously obtained private key for the computing device 104, as well as performing a hash to confirm the previously provided hash, and can therefore properly register the computing device 104 as a node for the category. In particular, the computing device 104 will be added as a node to the set of nodes 106-x.

As discussed previously, nodes are assigned to a particular category and assigned a particular role. This can be done for one or more of a number of different reasons. For example, some embodiments of the invention may segment data based on policy, defined characteristics, or for other reasons into smaller chunks of encrypted packets spread across different categories of nodes. Alternatively or additionally, embodiments may be implemented where each category has its own unique characteristics in distributed space to ensure that no one node is responsible to serve 100% of data and to do a majority of processing irrespective of its capabilities and configuration. Categorization of nodes can help cluster data in ways to accomplish data segmentation and/or distribution of distributed computing system 100 functionality across different categories.

Note that as illustrated above, each node is responsible to process and/or store only a certain portion of distributed computing system data.

In some embodiments, unless a node is a public node, that node will only connect with other nodes in its category.

In some embodiments, a node would not have to be concerned with other categories and the functionality performed by those categories, but rather could focus on its own category.

The following now illustrates how nodes are added to a particular category. Some embodiments may include policy for the distributed computing system 100 which defines the requirements of each given role where the roles are defined according to processes that would need to be performed for a blockchain network to be sustainable. Each policy for a role would have a defined range of characteristics for the role. For example, a node assigned to a transactions role, in one particular distributed computing system, would need to have between 4 to 6 processing cores and 2 to 8 GB of RAM to be assigned a transactions role.

Based on the policies, and the characteristics obtained for computing devices joining the distributed computing system 100, the characteristics of joining computing devices can be mapped to attempt to identify suitable roles for joining computing devices.

Figure 4:
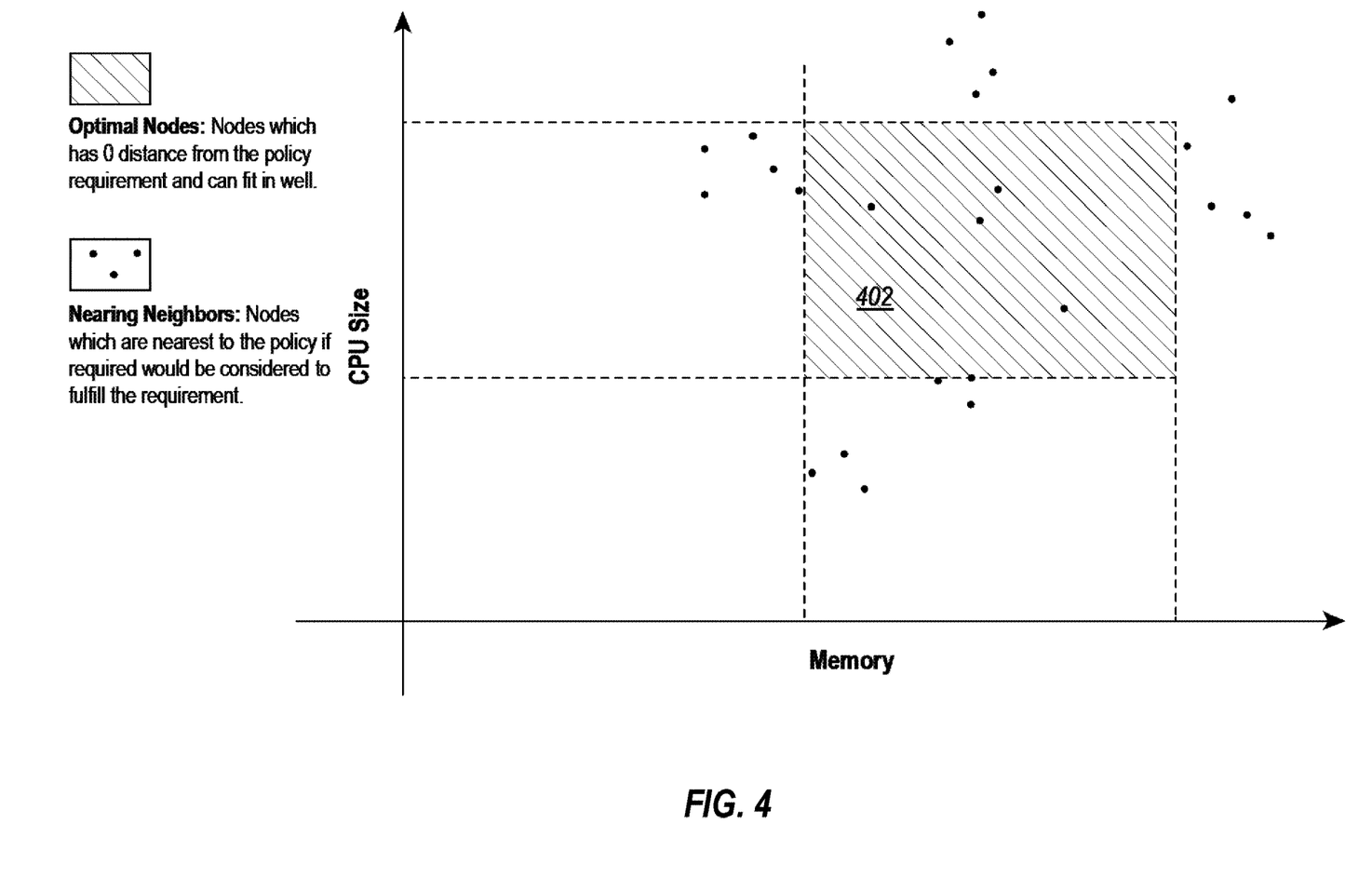
FIG. 4 illustrates a 2-dimensional mapping of device characteristics for determining a category for a computing device.

For example, attention is directed to FIG. 4 which illustrates a two-dimensional characteristic-based mapping where nodes are mapped based on CPU size and memory. Note that in this case, only these two dimensions are shown for ease of illustration as it would be difficult to illustrate more dimensions than two. However, it should be appreciated, that embodiments typically will map multiple different dimensions as described previously herein. In particular, embodiments may implement n-dimensional vector mapping as described previously.

In the example illustrated in FIG. 4, a given policy could have a fixed area 402 on the graph from which to select nodes to identify nodes that can comply with the policy and the corresponding role. In some embodiments, the policy may actually be a point on the graph, and a nearness requirement may be used to identify nodes that are near the policy which could be considered to be able to fulfill the requirements of the policy to be implemented in a particular role.

Assigning nodes to categories could be accomplished in a number of different fashions. For example, in one embodiment there may be a set number of categories in which nodes would be joined to the categories based on the characteristics of the nodes. Alternatively, embodiments may have a heuristic-based definition starting with a predetermined number of categories and increasing the number of categories as needed.

In some embodiments, remapping the various nodes, with corresponding changes to the various categories of the distributed computing system 100 could be performed as a result of a change in capacity of the distributed computing system 100, node outages that caused certain categories to have their health suffer, to balance the change state, or for other reasons.

As noted above, various characteristics could be graphed including capacity and type, memory availability and performance, storage space available, Internet IP availability, reachable private IP sets, average time of device connectivity to wide area networks, reliability, reachability, physical and/or logical proximity to other nodes in the distributed computing system, uptime of the computing device, ability to participate in various processing, mining, and/or data storage functionality, etc. thus, a graph with many dimensions could be implemented. These characteristics can be used to plot a node into its appropriate role.

For example, a node of a smaller size and capacity such as a mobile phone or tablet might not be able to store large amounts of data or perform heavy data mining processes, but it can help in storing a slim chain and also in small-scale processing such as categorization, returning node validations, storing session information, etc.

Additionally, by segmenting storage of data and processing into different categories, a reduced number of devices can be responsible for particular storage and/or processing resulting in a more efficient system. In particular, rather than needing all of the nodes in the distributed computing system 100 to be evaluated to determine if a sufficient number of nodes agree on data or in operation, a smaller number of nodes may be evaluated to determine if storage and/or operations should be validated by consensus of the smaller number of nodes.

Note that some nodes may simply have the role of being a small part of the blockchain and act as a middleware node which only reads requested data, helps to compile various segments of a profile from different clusters of nodes, etc.

The following now illustrates details with respect to when a node connects to a category and achieves appropriate state for a node in the category. In particular, when any node becomes part of the distributed computing system 100, which in this example is a blockchain network, it will have to maintain state based on its category and role allocation. For example, it might need to obtain state data from nodes in its category and validate incoming packets from a minimum trustable number of nodes. Often, policies will be implemented where 51% or above of participating nodes will need to validate an incoming node.

There are several factors to consider when a node is connecting to a category. For example, a new node will be joined to a category and will have virtually no data for the category. Alternatively, a node existing in a category may receive live data that needs to be committed. That is, in the ordinary operation of the node in the category, new data may be added to the category and the node will need to be able to update that data on the node. Alternatively, a node that has left a category may return to the category and may have partial category state stored on the node. This node will need to have any missing state applied to the node. Alternatively, a node may change categories and/or roles. This may require that any state data be removed from the node, and the node be treated as a brand-new node for a different category.

A new node joining a category is the simplest case to address. The new node will connect to its assigned category. In some embodiments, this involves joining to a particular number of accessible IP addresses of nodes in the category. For example, the registration confirmation packet 114 provided to the computing device 104 may specify the number of nodes to which the computing device 104 should connect to in a new category. The new node can then connect to the specified number of computing the nodes and obtain state data to bring the node up to state for the particular category.

Figure 5:
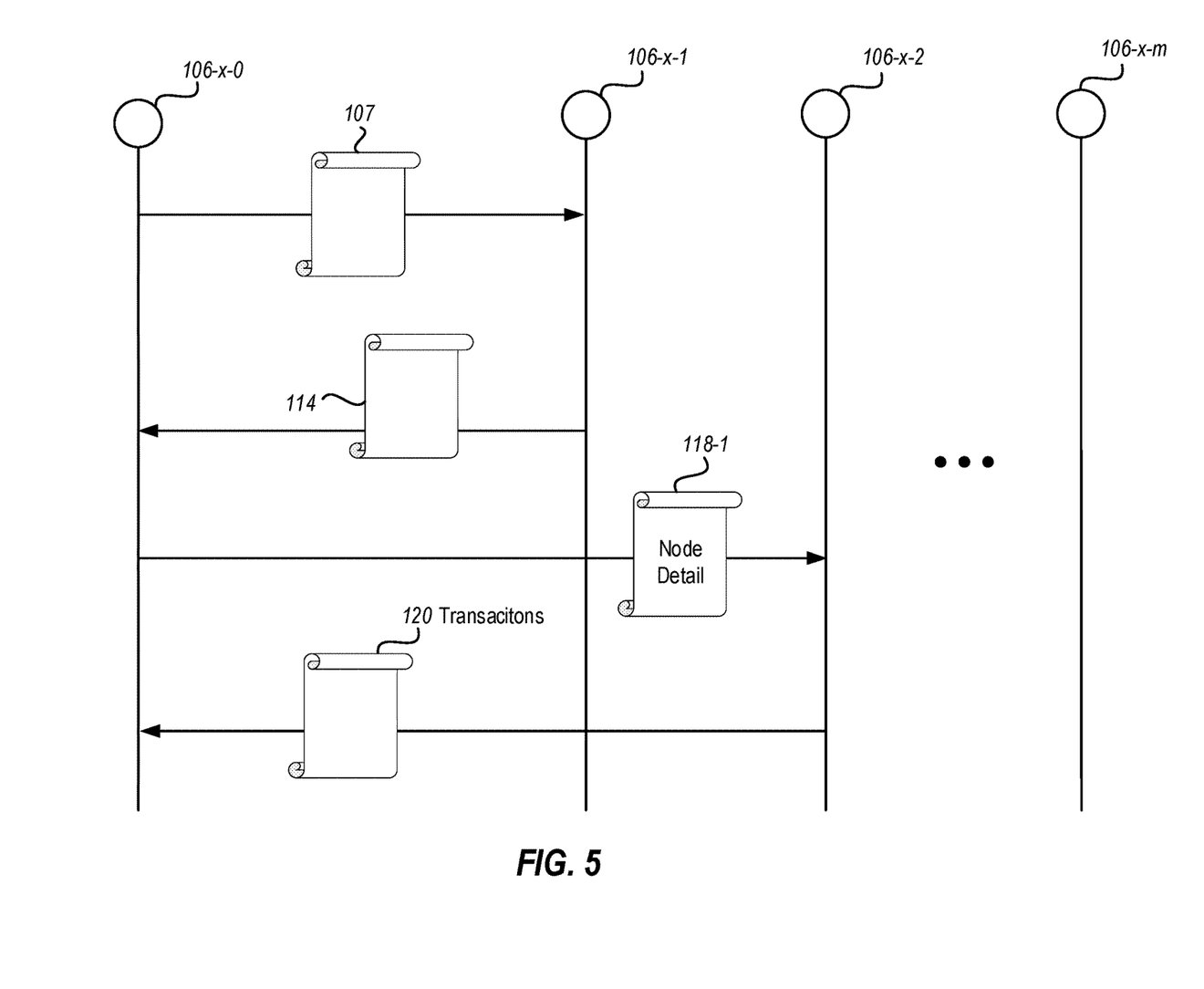
FIG. 5 illustrates a process flow of a computing device joining a category.

Referring now to FIG. 5, an example of a node 106-x-0 connecting to a category, and the distributed computing system 100 is illustrated.

The node 106-x-0 connects with the node 106-x-1. From this node, the node 106-x-0 will obtain registration details along with all the latest transactions that have been completed in the category.

The node 106-x-0 then connects with another node in the category, in particular node 106-x-2. The node 106-x-0 will pass node details in a message 118-1 and prove that it is a valid node (returning to the category in this case). Once the node 106-x-0 establishes trust it will also attempt to synchronize state with the node 106-x-2. In some embodiments, this may be accomplished by the node 106-x-0 sending its latest Merkle Tree Head and number of blocks. The node 106-x-2 would validate both the count and current head of its tree. If found to be of a different count then it would go to that specific level in its tree and then match the head. If still found different then it means that the new node is in stale state and complete data needs to be refreshed as if the node 106-x-0 were a new node being added to the category.

The node 106-x-2 returns back all the transactions 120 (as per its category) to the requesting node 106-x-0 and the requesting node 106-x-0 (which already has data from node 106-x-1) does not immediately erase the content rather, it tries to connect to another, third node in the category and repeats the same process as with the node 106-x-2. This is done to validate that two randomly selected nodes respond back with the same content and manipulated head. If the third node also responds back with the total count and head of tree as node 106-x-2, then this means that both the nodes are in stale state. And it will remove all stale data and try to fetch the latest state from the APIs being shared.

The above process will be repeated to connect with other nodes in the category. Note that a node being connected to a category, in some embodiments, will connect to a minimum number of nodes in the category to be in-state. In some embodiments, the node 106-x-0 may connect with one or more other nodes from other clusters. However, these connections will be non-transactional connections meaning that transactions will not be committed between the node 106-x-0 and nodes external to the category for the node 106-x-0.

The following now illustrates details with how transactions can be committed within a category using a graph or tree-based approach.

Some embodiments may be implemented which center around the idea of delegations where instead of each node talking to every other node in the category, they rely on the other nodes to partially participate in the overall communication process. Thus, not all nodes will be connected to every other node in the category. Rather they will have indirect connection where the number of nodes participating in the indirect connection can be more than one.

Figure 6:
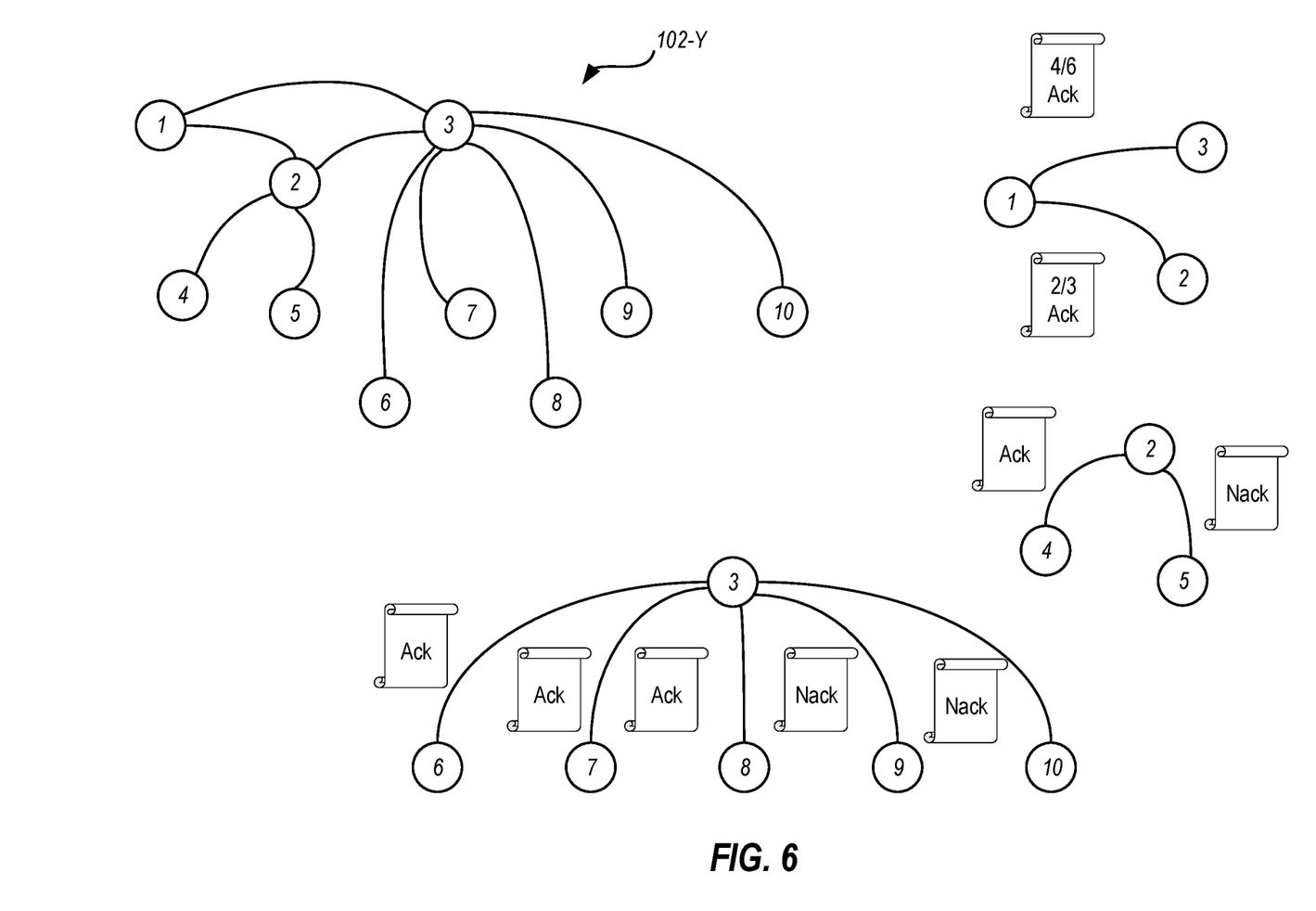
FIG. 6 illustrates nodes in a category committing a transaction.

Referring now to FIG. 6, each node will be connected (directly or indirectly) to every node in the category. The nodes can be directly and indirectly connected as well. Meaning if node 1 is connected to node 2 and node 3; node 2 will not be prevented from connecting to node 3 rather preference to other non-direct siblings would be given first.

The connections are bidirectional. If node 1 is connected to node 2, then node 2 is connected to node 1 as well. An example is now illustrated. In this example, nodes 1-10 are shown. Node 1 is connected to nodes 2 and 3. Node 2 is connected to nodes 1, 3, 4 and 5. Node 3 is connected to nodes 2, 6 through 10.

Assume that node 1 wants to commit a transaction. This node can only commit the transaction if it obtains a quorum of over 50% of the nodes in the cluster 102-Y.

Node 1 communicates with nodes 2 and 3. Node 2 communicates with nodes 4 and 5. Node 2 ignores node 1 because the request came from node 1. Node 2 ignores node 3 because the request already went from node 1 to node 3. Node 3 communicates with nodes 6 through 10. Node 3 ignores node 1 because the request came from node 1. Node 3 also ignores node 2 because the request indicates that it went to node 2 as well.

Node 2 gets ack from node 4 and nack from node 5. Node 2 then communicates with node 1 and indicates ack with quorum of 2/3 (including an ack for itself). Node 3 gets ack from nodes 6 through 8 and nack from nodes 9 and 10. Node 3 communicates with node 1 and indicates ack with quorum of 4/6 (including an ack for itself). Node 1 commits the transaction as it has quorum of 7/10.

Attention is once again directed to FIGS. 7A and 7B. These figures illustrate additional details with respect to a node rejoining a category.

Figure 7A:
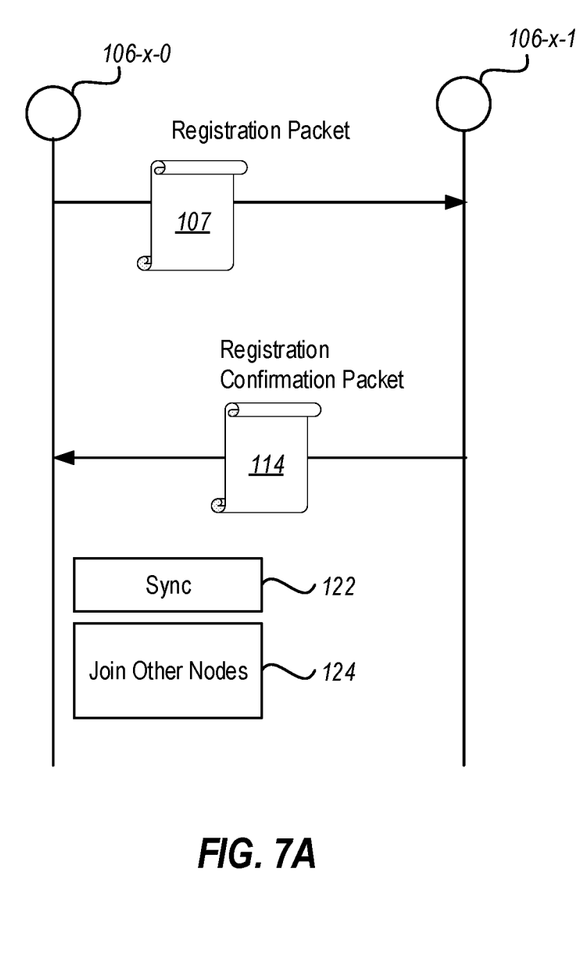
FIG. 7A illustrates a node rejoining a category.

FIG. 7A illustrates an example where the node 106-x-0 is attempting to connect to a node 106-x-1 that was previously in the same category as the node 106-x-0. The node 106-x-0 sends the device registration packet 107 to the node 106-x-1. Note that the device registration packet 107 is signed using the private key generated previously for the node 106-x-0. This allows the node 106-x-1 to quickly validate the device registration packet 107. If the node 106-x-1 is still a part of the category of which nodes 106-x-0 and 106-x-1 were previously members, then the node 106-x-1 can send the registration confirmation packet 114 to confirm that the node 106-x-0 is readmitted to the category. If this is successful, then the node 106-x-0 will synchronize data with other nodes in the category as illustrated at 122 and join other nodes in the category as illustrated at 124.

Thus, a returning node will be allowed to join the category if the same is able to verify successfully it indeed is the node that was earlier part of the category using the private key for the node 106-x-0 to sign the device registration packet 107. The returning node 106-x-0 will be able to sync the data to latest state by asking for transactions/blocks that it missed while it was not part of category, as illustrated previously herein.

Additionally or alternatively, the returning node will build a new list of neighbor nodes, as illustrated at 124, giving preference to retaining nodes that were previously known to the node and are still available in the category. Embodiments can ensure that previously known nodes are still assigned the same category that the current node is part of.

The following illustrate various special considerations that may be taken into account when a node reconnects to a category.

In some instances, a node rejoins the distributed computing system, but with a different capacity. In this case, the node will often be assigned a new different category and/or role. For this to occur, in some embodiments, all current data at the node for the current category will be discarded. New data for the new category will be synced. The node will obtain and maintain a new list of nodes to connect to, as the current list will have nodes belonging to a category that is different than the new category. Essentially, the node 106-x-0 will operate as the computing device 104 illustrated in FIG. 3 to rejoin the distributed computing system 100 as a new node in a new category.

Figure 7B:
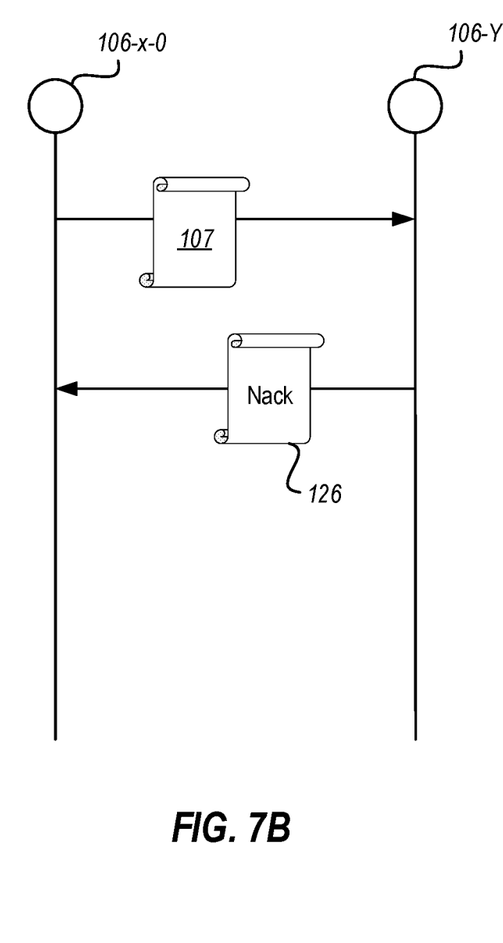
FIG. 7B illustrates a node being rejected from rejoining a category by a public node that has left the category.

In some situations, as illustrated in FIG. 7B, the node 106-x-0 will attempt to join the distributed computing system 100 by connecting to a node that was previously in the same category as the node 106-x-0 but that is no longer in the same category as the node 106-x-0. In the example illustrated in FIG. 7B, the node 106-x-0 attempts to connect to the node 106-Y. The node 106-Y was previously in the same category as the node 106-x-0, but has since disconnected from that category. In the example illustrated in FIG. 7B, the node 106-x-0 sends a device registration packet 107 to the node 106-Y. The node 106-Y sends back a nack, 126 indicating that the node 106-Y is unable to add to the node 106-x-0 to the distributed computing system 100. This may be a result of the node 106-Y belonging to a different cluster than it previously belonged to, the node 106-Y being disconnected from the distributed computing system 100 in general, or for other reasons.

When this occurs, node 106-*x*-0 can attempt to join the distributed computing system as a new node, such as is illustrated in FIG. 3. Alternatively or additionally, the node 106-*x*-0 may attempt to identify other public nodes in the category that the node 106-*x*-0 previously belonged to in an attempt to connect to the same category that the node 106-*x*-0 previously belonged to.

Note that embodiments of the distributed computing system 100 may include the ability to maintain category health and efficiency for each of the various categories in the distributed computing system 100. In a complete distributed heterogeneous node capacity scenario, with a large set of diverse systems, there may be a need to balance and rebalance categories. For example, this can be done to segment nodes into categories to serve different data bundles and/or processing functionality. Intelligent cluster management can not only divide the nodes into categories but can also ensure that each category is healthy at any given point in time.

Here "healthy" is defined by number of nodes seeding the category, including having a healthy buffer of additional nodes. For example, in some embodiments, the health scale is divided into A plus, A, B, and C [critical] where A is 100% of threshold 'T' for a category to be called healthy over average time 't'. A plus is some percentage above a number A. B is some percentage below A. C is some percentage below B, where a category needs critical seeding from the blockchain. Thus, embodiments may be implemented where categories should be assigned nodes by the categorization engine 109 based on these thresholds. For example, if possible, embodiments may attempt to maintain all categories in an A plus state. However, if there are an insufficient number of nodes to accomplish this, categories can be maintained at A or B states. When a category is in a C state, embodiments may perform prioritized actions to attempt to add additional nodes to put that category into a higher state.

A node participating in one category can leave its category and refresh its system with another when requested to improve the health of another category.

For example, nodes may be plotted in to the n-dimensional graph, and an appropriate category assigned. However, that node may be close to nodes in another category as determined by a proximity value for the node with respect to another category. The proximity values of nodes can be used to determine category reassignments to improve health of categories.

Some embodiments may implement an elastic node dormant period. In particular, nodes will have different types of connectivity and marking a node not part of the distributed computing system 100 when the node is not available for some time can lead to potential issues. Some embodiments implement a predefined period. A node can leave and rejoin the distributed computing system within that timeframe, using previously generated credentials, such as the previously generated public-private keypair. If a node is not available for the time defined in the predefined period, it is safe to mark the node as not part of the distributed computing system. If the node attempts to rejoin the distributed computing system after that time, it has to start the joining process from scratch.

Some embodiments may be implemented where the overall number of nodes syncing data in a category is capped. Any excess nodes wishing to join will be held in reserve without being connected to the distributed computing system and/or a category. This is done to ensure that a category has enough nodes available to work for external requests, but will not be bogged down by internal data transfer including required data synchronization at each (or at least a quorum) of the nodes.

Embodiments include functionality for cleaning up nodes. In particular, the binary executed by a node may include a cleanup feature. For example, if a node has been offline for some predetermined period of time, the binary may execute a self-destruct function for category and/or distributed computing system data. In this way, nodes can implement a self clean up after some predetermined period of time.

A node will have a threshold timeframe during which it can try to connect (join) to a previously joined category. If the node is not able to join in that timeframe, it can assume the data it has is of no worth and should be discarded.

Embodiments may be implemented where nodes are configured to gracefully leave a category. For example in some embodiments, a node may determine that it is permanently, or at least semi-permanently, leaving a category to which it belongs. If the note has information indicating that the node is permanently or semi-permanently leaving the category, the node can simply delete any category data as part of the process of leaving the category. Thus, in some embodiments, when a node has an anticipation of rejoining a category, category data will be maintained for a predetermined period of time before deletion, whereas when a node has information indicating that the node intends to leave the category permanently, then the node can more quickly delete category data as part of the process of leaving the category.

Embodiments may implement this clean-up as a self-driven process as other nodes will not have access to the node's contents as they are no longer connected. In some embodiments, this may be implemented on a best-effort basis. The distributed computing system should function under the assumption that data has not necessarily been deleted by nodes leaving the distributed computing system. Clean-up processes will mainly comprise destroying the category data. Even though the node may continue to store category data, embodiments may be implemented to ensure that data is accessible only to the distributed computing system applications such as node client code. This can be done to help ensure that data maintained on a node leaving the distributed computing system is not accessible to other entities.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
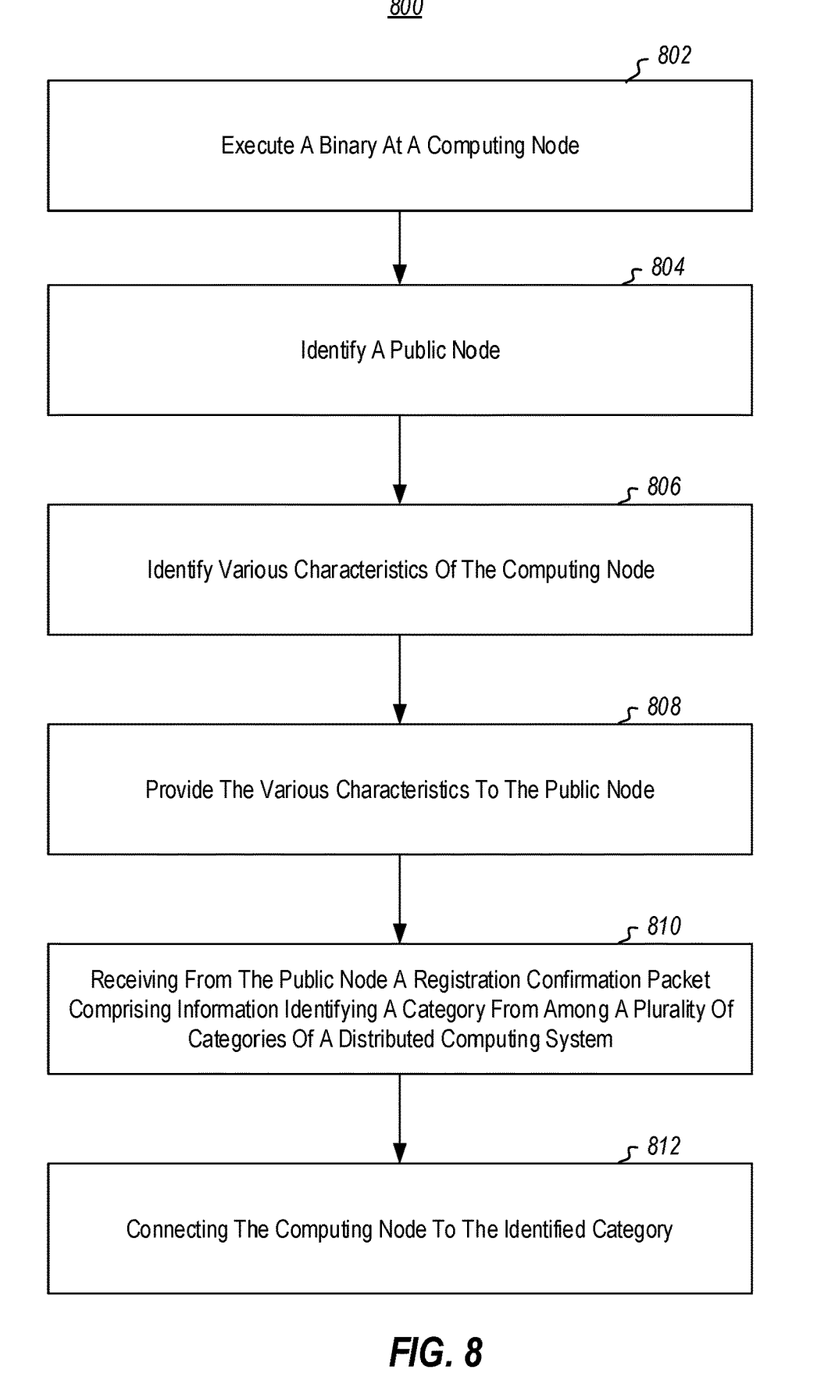
FIG. 8 illustrates a method of a computing node being joined to a category.

Referring now to FIG. 8, a method 800 is illustrated. The method 800 may be practiced in a distributed computing system. The method includes acts for adding a computing node to the distributed computing system.

The method 800 includes executing a binary at a computing node (act 802). The binary is a binary for nodes of the distributed computing system. For example, the binary may be a binary that computing devices obtain when they wish to join a blockchain network.

The method 800 further includes identifying a public node (act 804). This may be done as a result of executing the binary. In particular, the binary may include a list of public nodes that can be contacted by a computing node wishing to join a blockchain network.

The method 800 further includes identifying various characteristics of the computing node (act 806). Again, this may be performed as a result of executing the binary. The binary may cause processes to be performed by the computing node that identifies various characteristics of the computing node.

The method 800 further includes providing the various characteristics to the public node (act 808). As noted previously, the public node can provide this information to a categorization engine which can map the computing node as appropriate for including in a distributed computing system.

The method 800 further includes receiving from the public node a registration confirmation packet comprising information identifying a category from among a plurality of categories of a distributed computing system (act 810). The identified category may be a category identified for the computing node based on the identified characteristics of the computing node, and based on the health of the identified category. In this way, the computing node is selected to be added to the identified category based both on the characteristics of the computing node and a need for additional computing nodes to be added to the category.

The method 800 further includes connecting the computing node to the identified category (act 812).

The method 800 may be practiced where providing the various characteristics of the public node further includes encrypting the various characteristics using a public key of the public node.

The method 800 may be practiced where providing the various characteristics of the public node comprises providing information that can be mapped into an n-dimensional vector map for use in identifying nodes already existing in the distributed computing system that are similar to the computing node.

The method 800 may further include generating a public private key pair as a result of receiving the registration confirmation packet.

The method 800 may be practiced where connecting to the distributed computing system by the computing node connecting to the identified category comprises connecting to a number of other nodes in the category up to a predefined maximum threshold.

The method 800 may further include synchronizing data at the computing node with data at other nodes in the identified category by identifying differences between data already existing at the computing node and data at other nodes in the identified category. For example, synchronizing data at the computing node may include using a Merkle tree to synchronize data.

The method 800 may be practiced where connecting to the identified category comprises connecting to other nodes in the identified category that were previously provided authentication information about the computing node from the public node.

The method 800 may further include the computing node connecting to a different category of the distributed computing system by deleting data for the identified category, connecting to one or more nodes in the different category, and synchronizing data with the one or more nodes in the different category.

Figure 9:
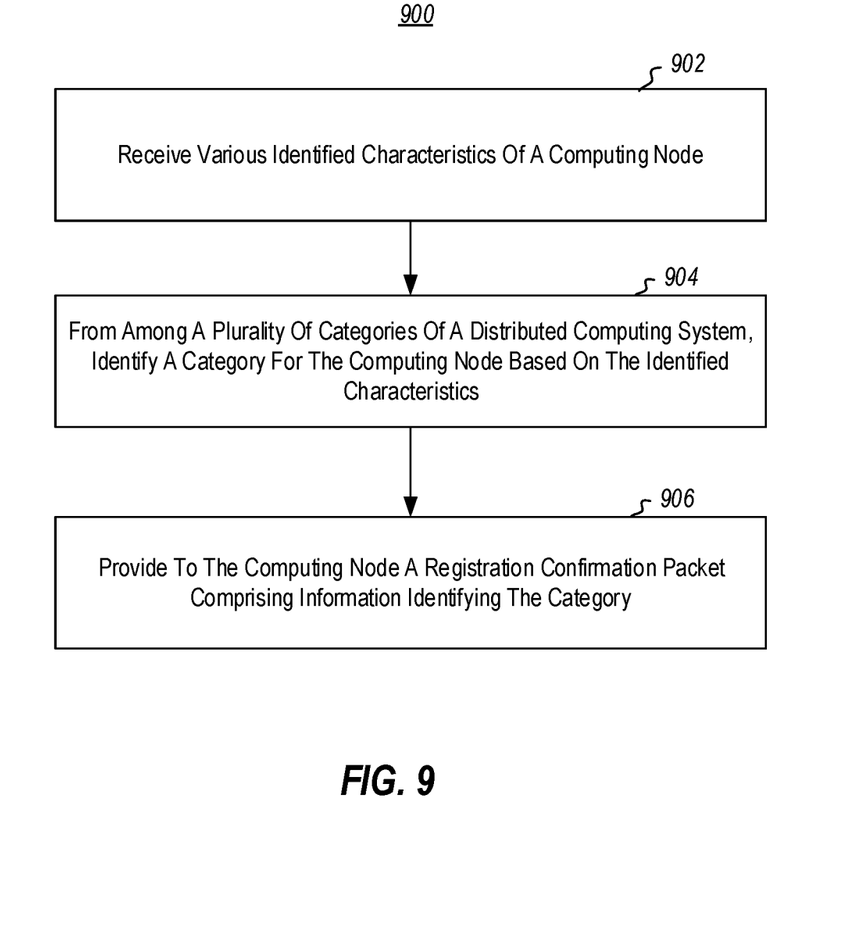
FIG. 9 illustrates another method of a computing node being joined to a category.

Referring now to FIG. 9, a method 900 is illustrated. The method 900 may be practiced in a distributed computing system. The method 900 may include acts for adding a computing node to the distributed computing system. The method 900 includes receiving various identified characteristics of a computing node (act 902).

The method 900 further includes from among a plurality of categories of a distributed computing system, identifying a category for the computing node based on the identified characteristics (act 904). The category may also be identified based on the health of the identified category such that the computing node is selected to be added to the identified category based both on the characteristics of the computing node and a need for additional computing nodes to be added to the category.

The method 900 further includes providing to the computing node a registration confirmation packet comprising information identifying the category (act 906). This allows the computing node to connect to the distributed computing system by connecting to the category.

The method 900 may be practiced where identifying a category comprises creating an n-dimensional vector map, where n is a number of fields created from the identified characteristics of the computing node, where the n-dimensional vector map maps other nodes in the distributed computing system. Such embodiments may further include identifying nodes from among the other nodes that are similarly mapped in the n-dimensional vector map. Such embodiments may further includes identifying the category as a category of the other nodes that are similarly mapped in the n-dimensional vector map.

The method 900 may further include identifying a health of the category, wherein identifying a health of the category comprises identifying a number of nodes actively connected in the category and comparing the identified number to one or more predefined threshold limits.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing system, a method of adding a computing node to the distributed computing system, the method comprising:
receiving a binary from a genesis server;
executing the binary at the computing node where the binary is a binary for nodes of the distributed computing system;
identifying a public node as a result of executing the binary, wherein executing the binary provides a list of public nodes;
identifying various characteristics of the computing node, prior to being added to a category in the distributed computing system, as a result of executing the binary, the various characteristics including at least one of compute capacity, compute architecture, memory availability, memory performance, storage space available, Internet IP availability, reachable private IP sets, average time of device connectivity to wide area networks, reliability, physical proximity to other nodes in the distributed computing system, logical proximity to other nodes in the distributed computing system, or uptime of the computing device;
providing the various characteristics to the public node;
receiving from the public node a registration confirmation packet comprising information identifying a category from among a plurality of categories of the distributed computing system, the identified category being a category identified for the computing node based on the identified characteristics of the computing node having been mapped into an n-dimensional vector graph mapping n characteristics such that the computing node is selected to be added to the category based on the computing node being in a predetermined area of the n-dimensional vector graph, either based on a fixed area of the n-dimensional vector graph, or by being within a nearness requirement for a point on the n-dimensional vector graph, and based on the health of the identified category such that the computing node is selected to be added to the identified category based both on the characteristics of the computing node and a need for additional computing nodes to be added to the category; and
the computing node connecting to the distributed computing system by the computing node connecting to the identified category.

2. The method of claim 1, wherein providing the various characteristics of the public node further includes encrypting the various characteristics using a public key of the public node.

3. The method of claim 1, wherein the various characteristics comprises all of the compute capacity, compute architecture, memory availability, memory performance, storage space available, Internet IP availability, reachable private IP sets, average time of device connectivity to wide area networks, reliability, logical proximity to other nodes in the distributed computing system, and uptime of the computing device.

4. The method of claim 1, further comprising generating a public private key pair as a result of receiving the registration confirmation packet.

5. The method of claim 1, wherein connecting to the distributed computing system by the computing node connecting to the identified category comprises connecting to a number of other nodes in the category up to a predefined maximum threshold.

6. The method of claim 1 further comprising synchronizing data at the computing node with data at other nodes in the identified category by identifying differences between data already existing at the computing node and data at other nodes in the identified category.

7. The method of claim 6, wherein synchronizing data at the computing node comprises using a Merkle tree to synchronize data.

8. The method of claim 1, wherein connecting to the identified category comprises connecting to other nodes in the identified category that were previously provided authentication information about the computing node from the public node.

9. The method of claim 1 further comprising the computing node connecting to a different category of the distributed computing system by deleting data for the identified category, connecting to one or more nodes in the different category, and synchronizing data with the one or more nodes in the different category.

10. A computer system comprising:
one or more processors; and
one or more computer-readable media having stored thereon instructions that are executable by the one or more processors to configure the computer system to add a computing node to the distributed computing system, including instructions that are executable to configure the computer system to perform at least the following:
receiving a binary from a genesis server;
executing the binary at the computing node where the binary is a binary for nodes of the distributed computing system;
identifying a public node as a result of executing the binary, wherein executing the binary provides a list of public nodes;
identifying various characteristics of the computing node, prior to being added to a category in the distributed computing system, as a result of executing the binary, the various characteristics including at least one of compute capacity, compute architecture, memory availability, memory performance, storage space available, Internet IP availability, reachable private IP sets, average time of device connectivity to wide area networks, reliability, physical proximity to other nodes in the distributed computing system, logical proximity to other nodes in the distributed computing system, or uptime of the computing device;
providing the various characteristics to the public node;
receiving from the public node a registration confirmation packet comprising information identifying a category from among a plurality of categories of the distributed computing system, the identified category being a category identified for the computing node based on the identified characteristics of the computing node; having been mapped into an n-dimensional vector graph mapping n characteristics such that the computing node is selected to be added to the category based on the computing node being in a predetermined area of the n-dimensional vector graph, either based on a fixed area of the n-dimensional vector graph, or by being within a nearness requirement for a point on the n-dimensional vector graph, and based on the health of the identified category such that the computing node is selected to be added to the identified category based both on the characteristics of the computing node and a need for additional computing nodes to be added to the category; and
the computing node connecting to the distributed computing system by the computing node connecting to the identified category.

11. The computer system of claim 10, wherein providing the various characteristics of the public node further includes encrypting the various characteristics using a public key of the public node.

12. The computer system of claim 10, wherein providing the various characteristics of the public node comprises providing information that can be mapped into an n-dimensional vector map for use in identifying nodes already existing in the distributed computing system that are similar to the computing node.

13. The computer system of claim 10, wherein the one or more computer-readable media further have stored thereon instructions that are executable by the one or more processors to configure the computer system to generate a public private key pair as a result of receiving the registration confirmation packet.

14. The computer system of claim 10, wherein connecting to the distributed computing system by the computing node connecting to the identified category comprises connecting to a number of other nodes in the category up to a predefined maximum threshold.

15. The computer system of claim 10, wherein the one or more computer-readable media further have stored thereon instructions that are executable by the one or more processors to configure the computer system to synchronize data at the computing node with data at other nodes in the identified category by identifying differences between data already existing at the computing node and data at other nodes in the identified category.

16. The computer system of claim 10, wherein connecting to the identified category comprises connecting to other nodes in the identified category that were previously provided authentication information about the computing node from the public node.

17. The computer system of claim 10, wherein the one or more computer-readable media further have stored thereon instructions that are executable by the one or more processors to configure the computer system to cause the computing node to connect to a different category of the distributed computing system by deleting data for the identified category, connecting to one or more nodes in the different category, and synchronizing data with the one or more nodes in the different category.

18. A physical computer-readable storage media having stored thereon instructions executable by one or more processors to configure a computer system to add a computing node to a distributed computing system, including instructions that are executable to configure the computer system to perform at least the following:
receiving a binary from a genesis server;
executing the binary at the computing node where the binary is a binary for nodes of the distributed computing system;
identifying a public node as a result of executing the binary, wherein executing the binary provides a list of public nodes;
identifying various characteristics of the computing node, prior to being added to a category in the distributed computing system, as a result of executing the binary, the various characteristics including at least one of compute capacity, compute architecture, memory availability, memory performance, storage space available, Internet IP availability, reachable private IP sets, average time of device connectivity to wide area networks, reliability, physical proximity to other nodes in the distributed computing system, logical proximity to other nodes in the distributed computing system, or uptime of the computing device;

providing the various characteristics to the public node;

receiving from the public node a registration confirmation packet comprising information identifying a category from among a plurality of categories of the distributed computing system, the identified category being a category identified for the computing node based on the identified characteristics of the computing node having been mapped into an n-dimensional vector graph mapping n characteristics; such that the computing node is selected to be added to the category based on the computing node being in a predetermined area of the n-dimensional vector graph, either based on a fixed area of the n-dimensional vector graph, or by being within a nearness requirement for a point on the n-dimensional vector graph, and based on the health of the identified category such that the computing node is selected to be added to the identified category based both on the characteristics of the computing node and a need for additional computing nodes to be added to the category; and the computing node connecting to the distributed computing system by the computing node connecting to the identified category.

19. The physical computer-readable storage media of claim 18, wherein providing the various characteristics of the public node comprises providing information that can be mapped into an n-dimensional vector map for use in identifying nodes already existing in the distributed computing system that are similar to the computing node.

20. The physical computer-readable storage media of claim 18, wherein connecting to the distributed computing system by the computing node connecting to the identified category comprises connecting to a number of other nodes in the category up to a predefined maximum threshold.

* * * * *